B. M. STEELE.
LOADING DEVICE.
APPLICATION FILED JAN. 5, 1907.
1,165,460.
Patented Dec. 28, 1915.
9 SHEETS—SHEET 4.
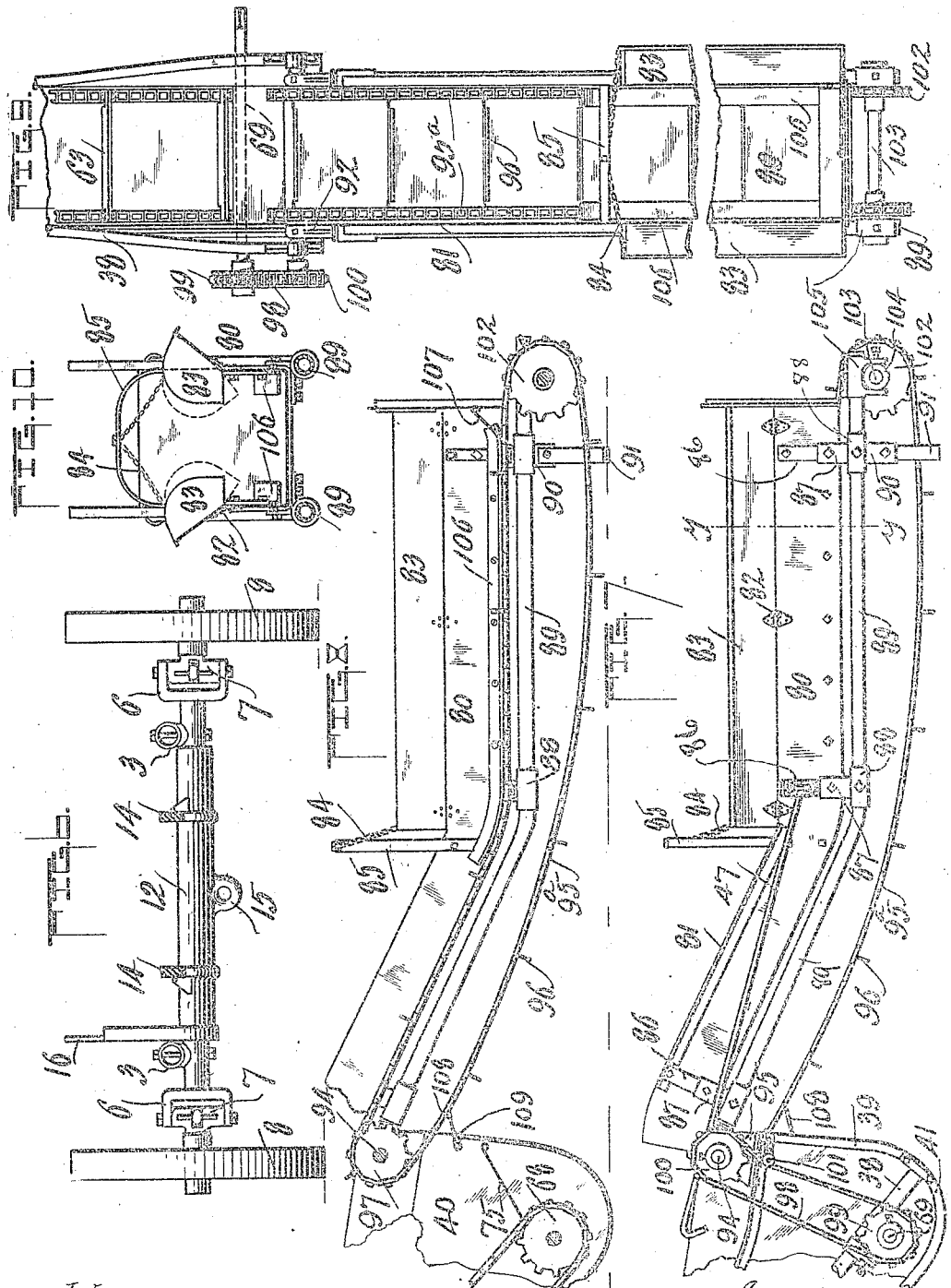

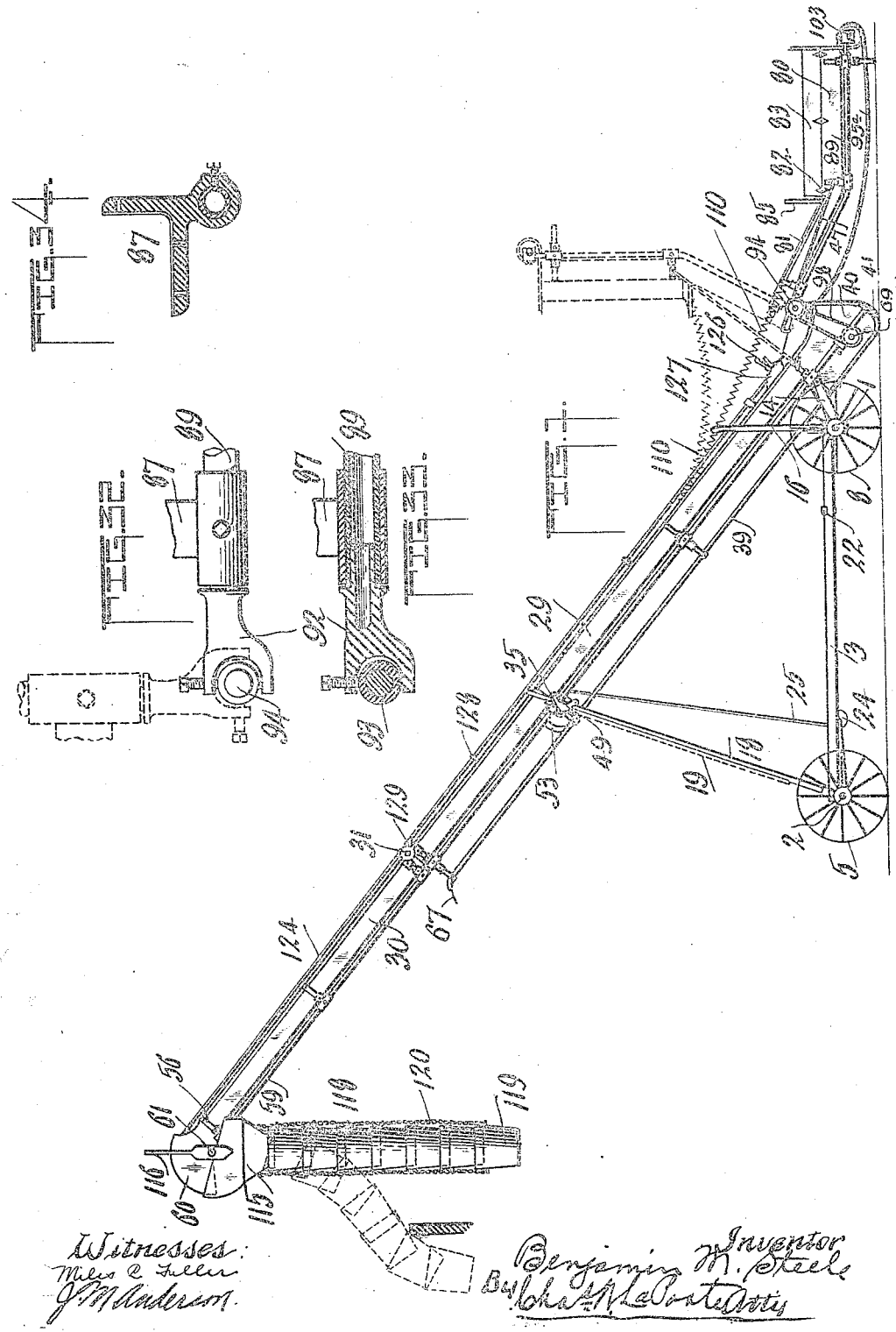

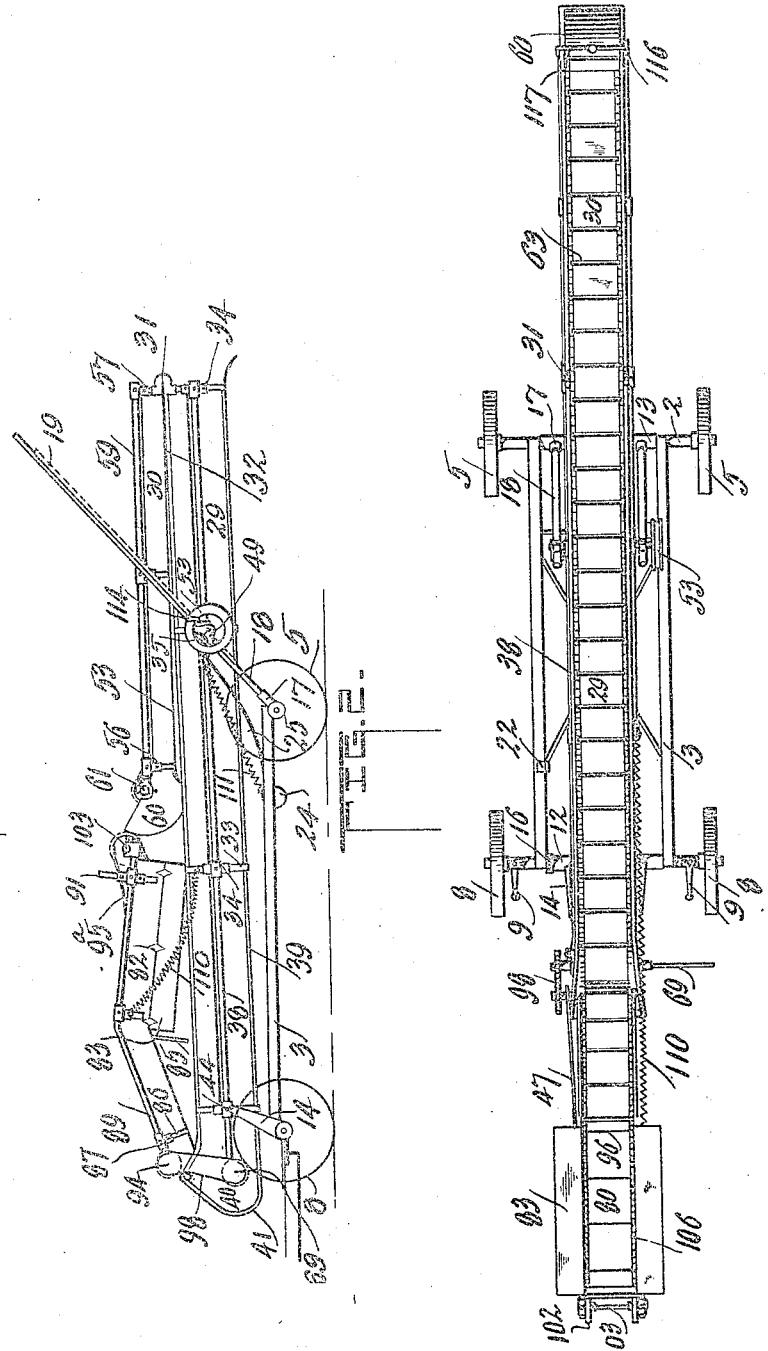

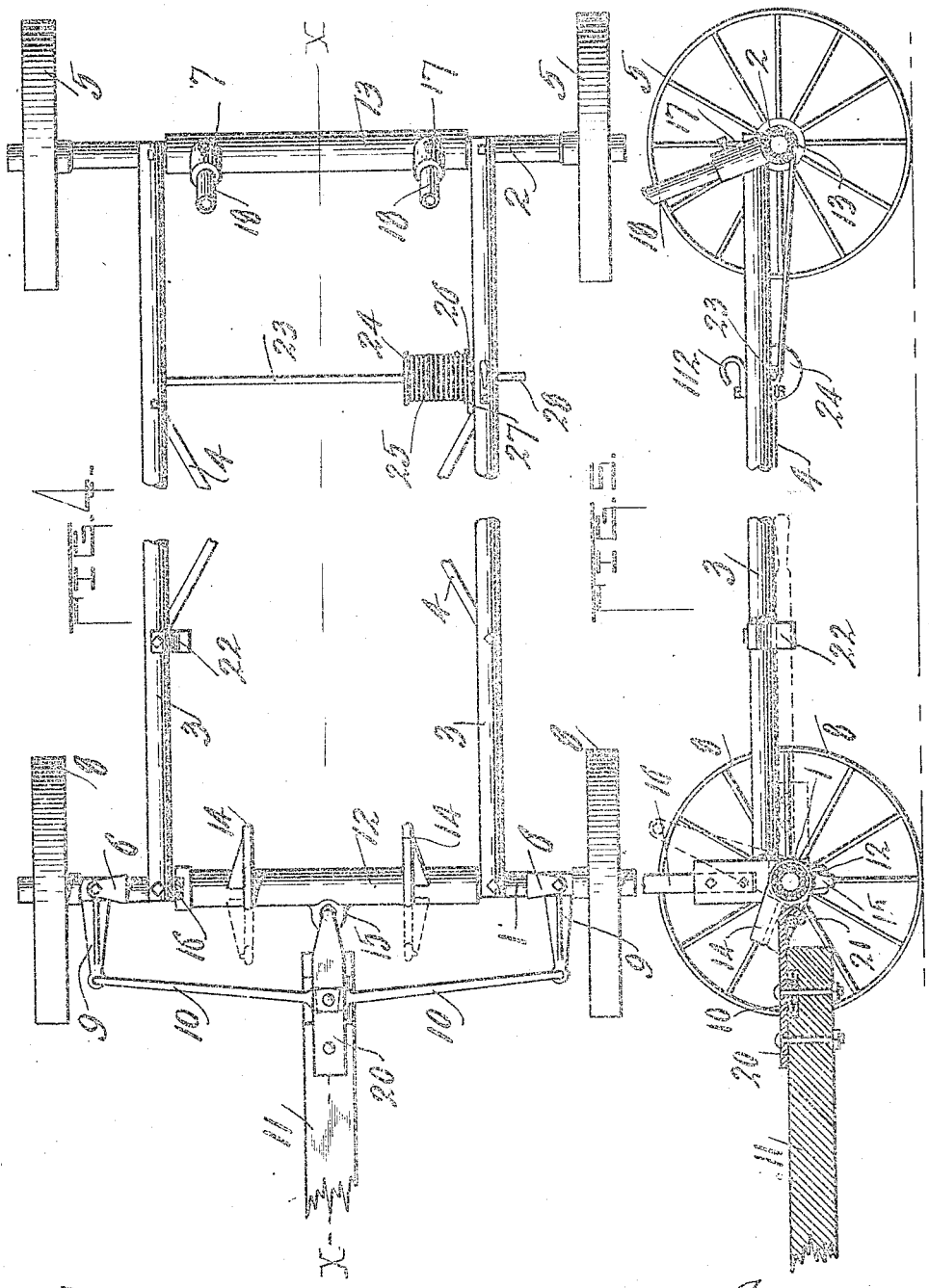

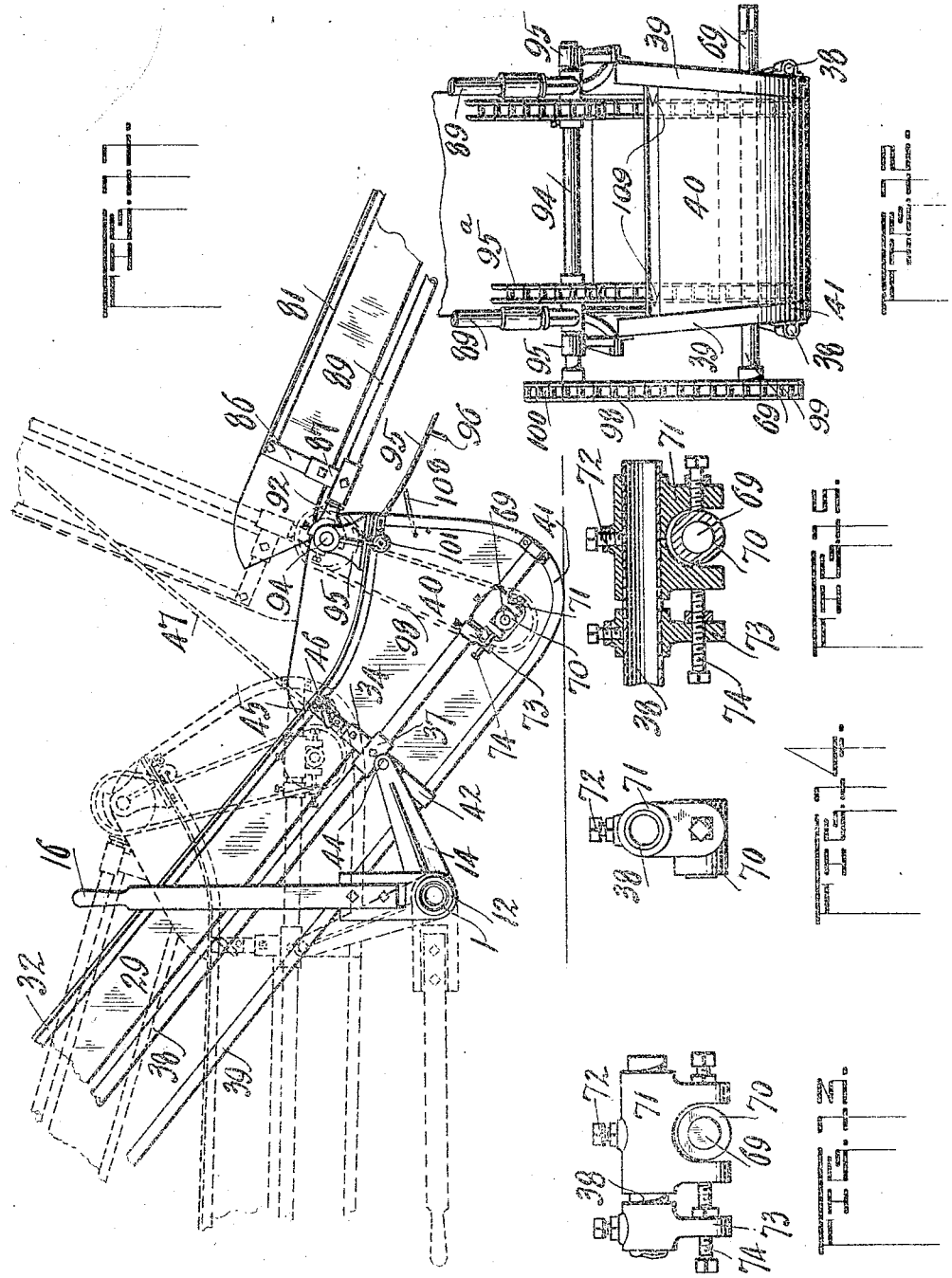

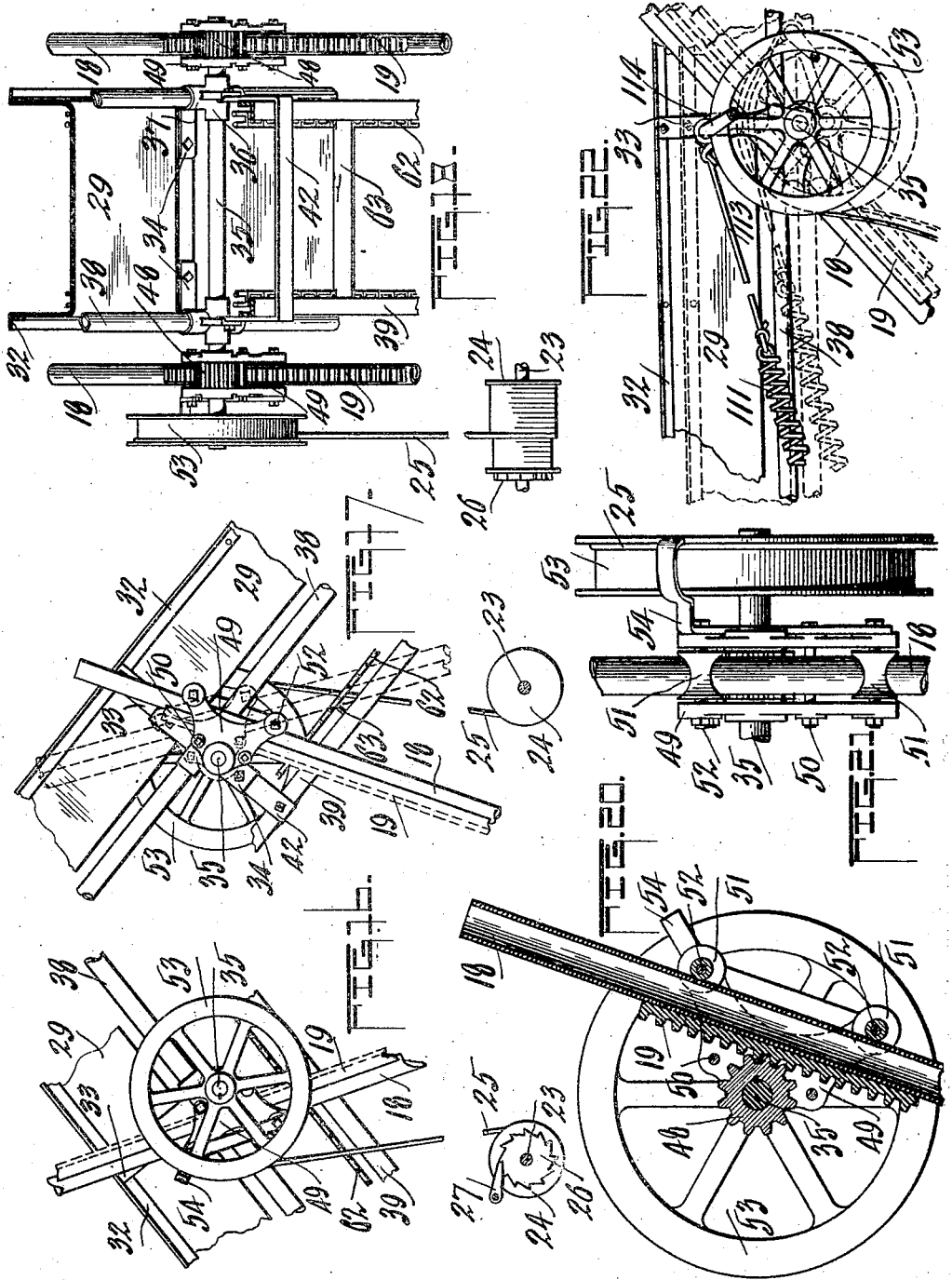

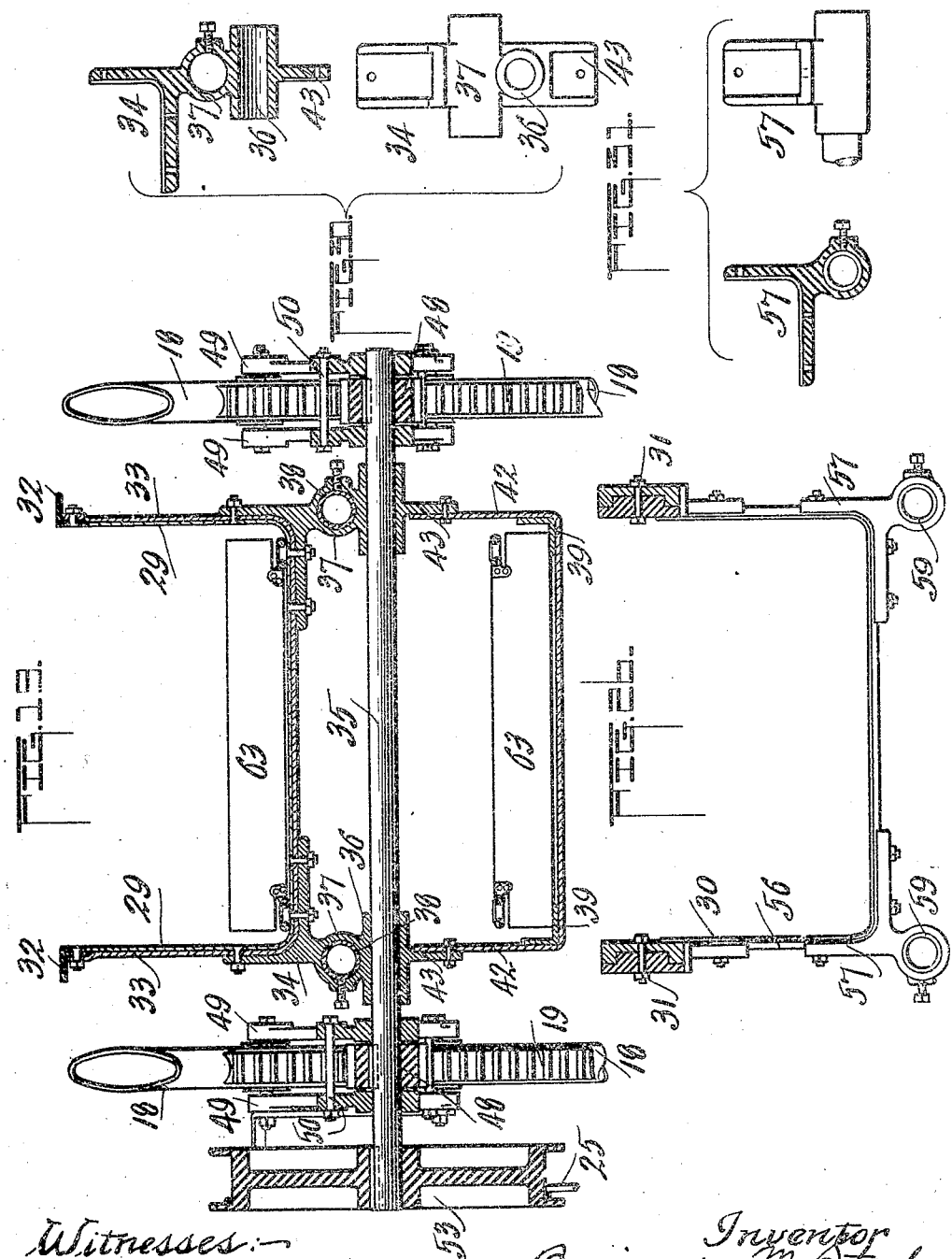

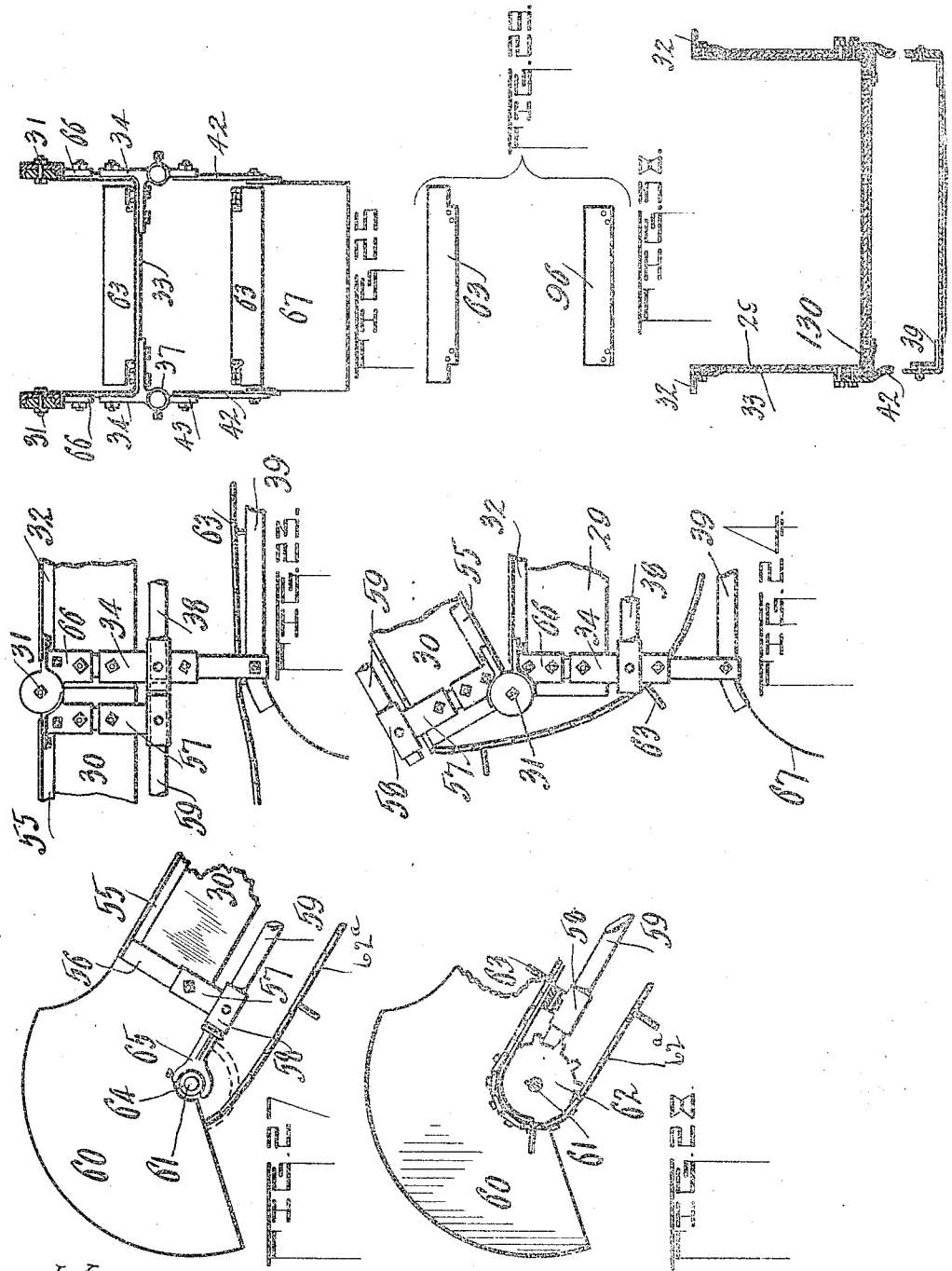

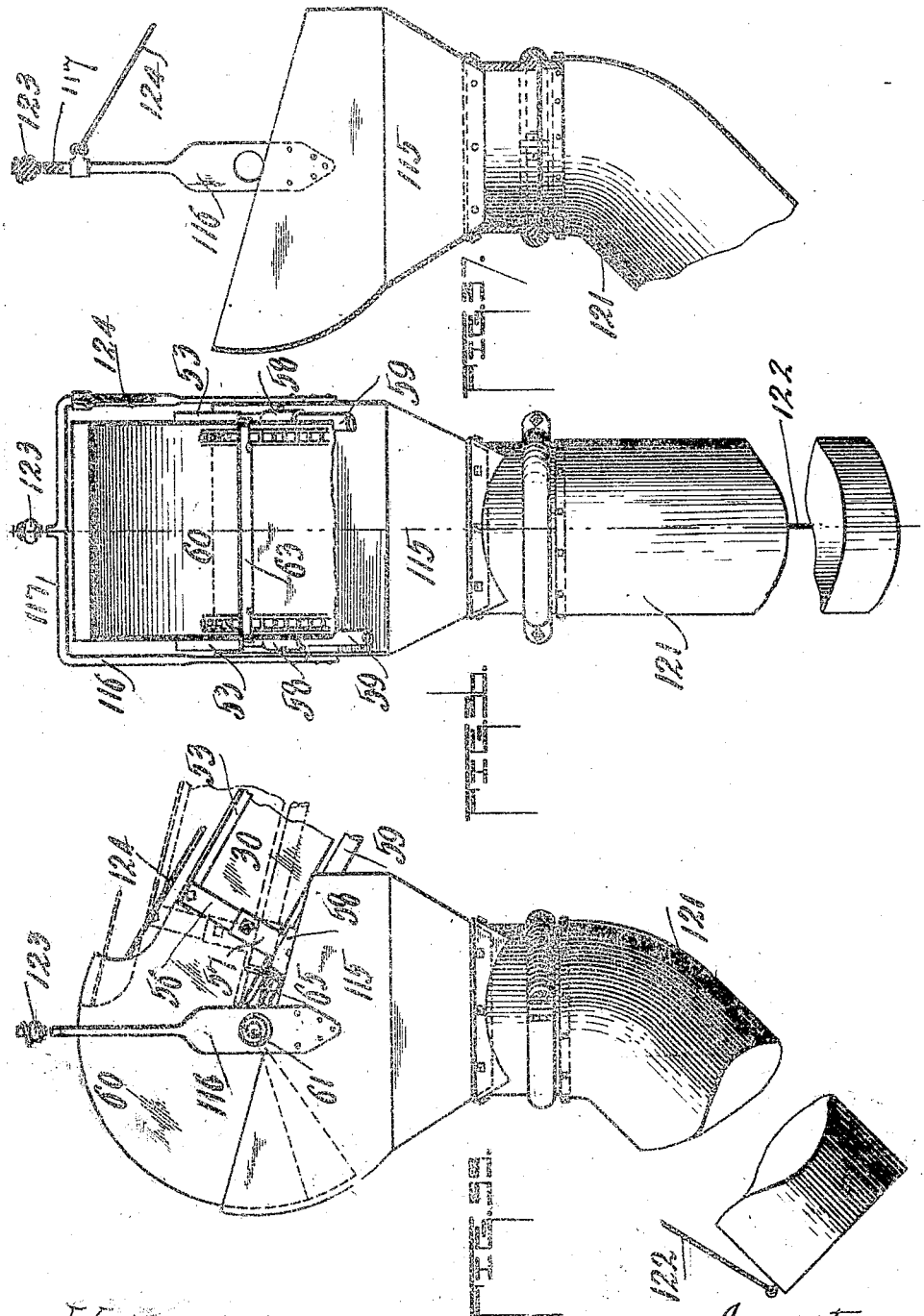

UNITED STATES PATENT OFFICE.

BENJAMIN M. STEELE, OF PEORIA, ILLINOIS.

LOADING DEVICE.

1,165,460.  Specification of Letters Patent.  Patented Dec. 28, 1915.

Application filed January 5, 1907. Serial No. 351,015.

*To all whom it may concern:*

Be it known that I, BENJAMIN M. STEELE, a citizen of the United States, residing at Peoria, in the county of Peoria and State of Illinois, have invented certain new and useful Improvements in Loading Devices; and I do hereby declare that the following is a full, clear, and exact description of the invention, which will enable others skilled in the art to which it appertains to make and use the same.

This invention has reference to certain new and useful improvements in loading devices and relates particularly to that type of elevating device employed as a portable elevator and adapted to be used in connection with a suitable jack or dump, the jack or dump being employed for raising a vehicle or other suitable receptacle so as to discharge from the same any material contained therein, into a conveyer forming a part of my loading device and from the conveyer, the material is discharged into the boot of an elevator, which elevates the same and by means of a suitable discharge head or spout at the upper end, discharges the same into a bin or other receptacle.

One of the objects which I have in view is a portable elevator mounted on a suitable truck and having pivotally connected therewith a conveyer, the said elevator comprising two hinged sections adapted to fold one upon the other and to a suitable discharge spout or head connecting with the discharge end of said elevator.

A further object of the invention is an elevator made up of a skeleton frame, preferably of two hinged sections, which sustain and have connected therewith a sheet-metal trough in which the conveying apparatus is adapted to convey material from one end of the elevator to the other.

The invention has for its further object a truck mounted upon wheels, an elevating body mounted on said truck comprising a skeleton frame sustaining a trough of sheet-metal, said elevator adapted to be raised and lowered by means of a rack geared to said elevator and to means for operating said gearing; and to a conveyer pivotally connected to the boot of said elevator and comprising a skeleton frame supporting a sheet-metal body, forming a part of said conveyer, the connection of the elevator with said conveyer adapting the same to be folded over on to the elevator.

For a further and full description of the invention herein and the merits thereof, and also to acquire a knowledge of the details of construction, of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a greatly reduced side elevation showing in outline, my improved elevator, its mountings and the conveyer connected therewith; the elevator shown in a raised position and in dotted lines; the conveyer is shown elevated, the position the same would be in when a vehicle was driven into position on to a jack or dump for the purpose of discharging material into the conveyer when lowered; in dotted lines the discharge spout of the elevator is shown extending into a suitable crib, or in a receptacle; Fig. 2 is a greatly reduced plan view showing in outline the devices illustrated in Fig. 1; Fig. 3 is a greatly reduced side elevation showing in outline the elevator with the sections thereof folded upon each other, and the conveyer also folded over and on to the elevator, the position the parts would be placed in when on the road or conveying the elevator from place to place; Fig. 4 is an enlarged plan view broken away, of the supporting truck for the elevator; Fig. 5 is a cross section taken on the line X—X of Fig. 4; Fig. 6 is a front elevation of the supporting truck for the elevator; Fig. 7 is an enlarged side elevation of the conveyer and showing the same connected with the elevator; Fig. 8 is a longitudinal and vertical cross section of the parts seen in Fig. 7; Fig. 9 is a plan view of what is shown in Fig. 7; with the hopper end of said conveyer broken away; Fig. 10 is a vertical cross section taken on the line Y—Y of Fig. 7; Fig. 11 is an enlarged side elevation of the lower end of the elevator with the inner end of the conveyer pivoted thereto. The elevator is shown in full lines with the boot in its lower position, or a position when the elevator has been raised and in dotted lines the position of the parts would be similar to what is shown in Fig. 3, that is, they are folded for the purpose of being conveyed from place to place; Fig. 12 is an end view looking at the elevator as the same would appear in Fig. 11; Figs. 13, 14 and 15 are enlarged side end and sectional details of a suitable coupling used in connection with the driving shaft of the elevator; Fig. 16 is an enlarged detail view looking at one side of the elevator upon which is carried a drum or wheel which is adapted to be operated for the purpose of imparting power to the gearing of the elevator which is geared to the rack bar employed for raising the said elevator; Fig. 17 is a view looking at the opposite side of the devices shown in Fig. 16; Fig. 18 is a rear elevation of the devices shown in Fig. 17; Fig. 19 is a cross section through the elevator and the raising and lowering means connected therewith, the same illustrating devices shown in Figs. 16, 17 and 18, but made on a much larger scale; Fig. 20 is a sectional detail of the rack and gearing the connection of the raising and lowering means for the elevator, the same being made on a scale corresponding to that shown in Fig. 19; Fig. 21 is front elevation of Fig. 20; Fig. 22 is a detail side elevation of the devices shown in Figs. 16, 17 and 18, and the position of the same when the parts of the elevator are folded for the purpose of being conveyed from place to place; said view showing in full lines the normal position of said parts and in dotted lines the vibration of the parts and how they are sustained by means of a supporting spring; Fig. 23 is an enlarged side elevation showing in detail the connection between the hinged section of the elevator; Fig. 24 is a view similar to that shown in Fig. 23, but the sections are in a position as they are being folded one upon the other; Fig. 25 is an end elevation of what is shown in Fig. 23; Fig. 26 is a cross section through the hinged portion of the elevator section, the view being on a much larger scale than is shown in Figs. 23, 24 and 25. Fig. 27 is an enlarged side elevation of the upper or discharge end of the elevator; Fig. 28 is a longitudinal and vertical cross section through Fig. 27; Fig. 29 illustrates the flights employed in the elevator and conveyer; Fig. 30 shows a sectional detail and elevation of the coupling used on the elevator for connecting the sheet-metal parts of the upper and lower run of said elevator, the same being shown in Fig. 19; Fig. 31 shows a sectional detail and elevation of a coupling used on the body of the elevator, seen in Fig. 26; Fig. 32 is a side elevation of the connection between the conveyer and the elevator; Fig. 33 is a longitudinal section through the parts shown in Fig. 32; Fig. 34 is a cross section taken transversely of Fig. 32 through the brackets; Fig. 35 is an enlarged side elevation showing a modified discharge spout in connection with the discharge end of the elevator; Fig. 36 is a rear elevation looking into Fig. 35; Fig. 37 is a cross section of the discharge spout shown in Fig. 35, and Fig. 38 is a view showing a modified construction of the elevator section and the mode of connecting the upper and lower run thereof to each other.

The truck to which reference has been made comprises the forward and rear tubular axles 1 and 2 which are connected by the parallel and spaced tubular bars 3, which said bars are braced by means of the straps 4 extending diagonally from one rod to the other, see Figs. 4 and 5, although the figures have been broken away which necessitates the breaking of the braces. On the outer ends of the axle 2 are carried the ground wheels 5; and to the outer ends of the axle 1, which is somewhat shorter than the axle 2, are connected the couplings 6 with which are pivotally connected the members 7 provided with spindles, (not shown) to which are connected the ground wheels 8. And extending forwardly from the members 7 are short cranks 9 with which are connected rods 10, the inner ends of which have a pivotal connection with the pole 11. On the axles 1 and 2 and between the tubular rods 3 are carried sleeves 12 and 13; the former having attached to or integral therewith cranks or short arms 14 which are suitably spaced apart and also an eye 15 preferably disposed centrally of said sleeves and for a purpose which will be explained. To one end of the sleeve 12 is attached a lever 16 to enable an operator to oscillate or partially rotate the sleeve an the axle 1. At or near the opposite ends of the sleeve 13 are provided the short tubular studs or sockets 17 with which are connected the lower ends of tubular uprights or standards 18 to which and extending a portion of their length are secured rack bars 19, see Figs. 1, 16, 17, 18 and 20.

It is when the truck and the elements supported thereby, are being conveyed or moved from place to place that the pole 11 is connected with the said truck, and the rods 10 which are connected with the cranks 9 are adapted to have a detachable connection therewith to be detached with the pole from the truck and the said pole is adapted by means of a strip 20 having a hooked inner end 21 to have a detachable connection with the eye 15 of the sleeve 12, such connection forming the fulcrum on which the pole is oscillated for the purpose of turning the forward wheels and changing the course of travel of said truck. It being understood that it is necessary to disconnect the pole, and parts connected therewith, from the truck when the apparatus is in position for operation or being operated, for the reason that the lower end of the elevator will have to be lowered with its boot upon the ground or in proximity thereto, and this could not be done if the pole and connections were left in place. When the lever 16 has been thrown from the vertical to a horizontal position for lifting the boot end of the elevator off the ground, in the manner and for a purpose to be described, the lever will be supported on a rest 22 attached to one of the tubular rods 3, as seen in Fig. 5, which will serve to partially sustain the working parts in their adjusted positions.

Suitably journaled on the truck and supported transversely thereof and beneath the tubular rods 3 is shown a drum shaft 23, carrying a drum 24 about which is adapted to be wrapped a cable or rope 25, said drum being controlled in its operation by means of a ratchet wheel 26 and a pawl 27 and one end of the said drum shaft is squared as at 28 to adapt the connecting therewith a suitable crank or hand piece to enable an operator to rotate the drum shaft 23.

The elevator as was above intimated comprises hinged trough sections which are made of sheet metal and supported by and suitably connected with a skeleton frame, at the lower end of which the trough section is provided with a boot and at the upper end connected with a discharge spout. The lower hinged section of the trough is indicated as 29 and the upper or outer hinged section thereof is indicated as 30 and said section is hinged at a point 31 to adapt the outer section to be folded over onto the lower section 29 somewhat in the manner seen in Figs. 3 and 24. A cross section of the lower section 29 is best seen in Fig. 19, wherein is also shown a lower run-way connected with the section 29 for the return of the conveying apparatus which travels upwardly through the section 29, said lower run-way being best seen in outline in Fig. 1.

Extending longitudinally along the upper outside edges of the trough section 29 are strips of angle iron 32 for stiffening that portion of the trough section, and connected at intervals in the length of said trough section 29 and with the same and also with the angle iron strips 32 are metal straps 33 which extend down and around the body of said trough section 29. And to these straps are connected brackets 34 by means of bolts which pass through the trough-section 29 as well as the straps and said brackets; these brackets have right angle portions, best seen in Fig. 19, which conform to the bottom and side portions of the said straps. The brackets 34 just referred to, are in most respects similar to each other and where they are different, these differences will be pointed out during the description of the same. For instance, the bracket 34 which is shown in Fig. 19 is arranged for carrying a transverse shaft 35 extending across and beneath the trough section 29 and journaled in bearings 36 in the said brackets, this shaft being connected in a manner to be described, with the rack bars 19 connected with the tubular uprights 18 heretofore referred to. And all of the said brackets 34 are provided with bearings 37 through which and with which are connected longitudinally disposed tubular supporting rods 38.

The lower run-way of the lower trough section of the elevator comprises preferably longitudinally disposed angle iron strips 39 suitably spaced apart and extending approximately from a point in line with the hinged connection of the upper and lower sections of the elevator, to the lower and forward end of the lower trough section thereof, so as to provide in connection with the lower end of the trough section thereof, a boot which I have referred to as 40, the angle iron strips being curved upwardly as shown at 41 for this purpose. These angle iron strips are sustained in connection with the trough section 29 and the supports therefor, by means of metal straps 42, similar to the metal straps 33, which have their upper ends fixedly connected to extensions 43 of the brackets 34 and said straps extend down and across and conform substantially to the shape of the straps 33 and it is to the transverse portions of said straps 42 that the angle iron strips 39 are suitably attached and arranged substantially as seen in Fig. 19. It has been stated that the trough section 29 was suitably bolted to the angle iron strips 32, the straps 33 and they in turn bolted to the brackets 34; this is also true of the straps 42, which are bolted to the brackets 34 and this is also true of the tubular rods 38 which pass through the bearings 37 in said brackets, as they are retained in position by suitable set screws or other locking means for rigidly connecting the frame-parts together. It will be seen that with this manner of connecting the parts that they may be very easily assembled or disassembled and that the trough section can be detached if desirable and the skeleton frame allowed to remain for the purpose of putting in new trough sections or for any other purpose.

Having a bearing in the brackets 34 at or near the lower end of the trough section 29 of the elevator and extending transversely beneath the same is a shaft 44, an end view of which is seen in Fig. 11, which said shaft is in all respects similar to the shaft 35 seen in Fig. 19 and is carried through the brackets substantially in the same manner as the shaft 35 and to the outer ends thereof are connected the free ends of the cranks or short arms 14 which have heretofore been referred to as being connected with the sleeve 12 on the front axle of the truck. And it will be seen from an examination of Fig. 11 that by drawing the lever 16 inwardly and down, an operator may raise the lower or boot end of the elevator from a position substantially as seen in full lines in said figure to a position shown in dotted lines; which said last mentioned position is the position which the parts have been placed in as shown in Fig. 3. To the upper end of the strap 33 connected with said lower bracket which has just been referred to, is connected a plate 45 carrying an eye 46 with which may be connected a rod 47 shown in dotted lines in Figs. 1 and 11, and also shown in full lines in Fig. 1, but detached from said eye, the object of the said rod being to sustain a conveyer connected with the boot of the elevator in the raised position shown in Figs. 1 and 11, which said conveyer will be more particularly referred to. Carried on the shaft 35 upon the opposite sides of said trough section 29 of the elevator are gear wheels 48, which are preferably fixed to rotate with the said shaft, and upon the opposite sides of each of said gear wheels and swingably carried on the said shaft are plates 49 which are connected with each other by means of the bolts 50 that they may swing in unison and between each pair of plates are carried the sheave wheels or flange rollers 51 which rotate on spindles 52 having a bearing at their opposite ends in the plates 49 upon the opposite sides of each of the gear wheels 48. Operating between each pair of plates 49 are the tubular uprights 18 which engage with the sheave wheels or rollers and the rack bars 19 which are attached to said uprights 18, mesh with or are geared to the gears 48 on the shaft 35; and on the outer end of one end of the said shaft 35 is a drum 53, which is fixed to rotate with the said shaft, and with said drum is connected the cable 25 heretofore referred to as being connected with the drum 24 on the shaft 23 of the truck. It will now be understood that with the operation of the drum 24 motion may be imparted to the shaft 35 through the connections just described, and the rotation of said shaft will cause the gears 35 to move up and on the rack bars 19, and thereby raise the said elevator, the connection between the crank arms 14 and the shaft 44 of the elevator forming a fulcrum on which the elevator may swing, the ratchet connection with the drum 24, serving to lock the position of the elevator whenever the operator releases his connection with the shaft on which the drum 24 is carried, and to lower the elevator, the operation just described may be reversed, the ratchet connection having been released, or if desired, the ratchet connection with the drum 24 may be released when the elevator may drop by gravity.

Attached to the plate 49 adjacent to the drum 53, is a plate 54 which extends up and over the edge of the drum 53 and serves as a guard for the rope or cable 25 connected with said drum to prevent the same becoming disconnected or jumping therefrom.

The gearing and the connections on the shaft 35 with which the rack bars 19 of the uprights 18 have connection are best seen in Figs. 16, 17, 18, 19, 20 and 21.

The upper end of the elevator having the trough section which has been referred to as 30 and described as being hinged to the lower section of said elevator having the trough section 29 is in most respects similar to the same lower section, with the exception, that it is not provided with the lower run-way composed of the angle iron strips which is provided in connection with the lower section of said elevator. However, extending longitudinally along the upper outside edges of the trough section 30 are angle iron strips 55 similar to the strips 32 connected with the trough section 29 and employed for stiffening the upper edges of said trough section 30, and connected at intervals with said strips 55 and extending down and around the body of the trough section 30 are metal straps 56 which are similar to the straps 33 heretofore referred to, and to said straps are secured brackets 57 provided with bearings 58 through which are passed and in which are journaled tubular rods 59, which together with the brackets, straps and strips form a skeleton frame for the outer or upper section of said elevator. The lower inner ends of the rods 59 extend through the brackets 57 which are connected with the lower inner ends of the trough section 30 and when the said trough section 30 or the outer end section of said elevator is unfolded, the ends of the rods 59 will enter the bearings 37 of the brackets 34 connected to the upper end of the trough section 29 of the lower section of the elevator with which the rods 38 are connected, the said rods 38 stopping short of the outer ends of the bearings of the brackets 34 to permit the rods 59 to have the connection therewith just described, and which is best seen in Fig. 23. The construction of the lower end of the trough section 30 is also such, that when the outer section of the elevator is unfolded, it will overlap the outer end of the trough section 29 of the lower section, which is also best seen in Fig. 23. To the outer end of the said trough section 30 and the supports therefor, is suitably connected or may be formed integral with the end of said trough section 30, an enlarged hood 60 and extending transversely through said hood or the lower portion thereof, is a shaft 61 on which are carried sprocket wheels 62 around which is adapted to travel a conveyer, composed of the endless chains or belting 62ª, to which and at intervals, are suitably connected flights 63 for conveying material from one end of said elevator to the other that the same may be discharged from the hood section just referred to. The outer ends of the shaft 61 are carried in boxings 64 which are detachably connected with arms 65 suitably secured to the outer ends of the rods 59; such boxings and other connections with the rods just referred to are similar to what is shown in Figs. 32 and 33, although said figures refer to the connections between the conveyer and the lower end of the elevator.

Referring again to the pivotal connection between the sections of the elevator; attention is called to the fact that such pivotal connection comprises a pair of hinged plates 66 which are adapted to be secured to the straps 33 and 56 respectively, of the outer and inner ends of the trough sections 29 and 30, see Figs. 23, 24 and 25.

The conveyer to which reference has been made, is adapted to travel through the trough sections 29 and 30 and on its return travels over the lower run-way of the lower section of the elevator, and said run-way on its outer end has connected with the angle iron strips 39 thereof a downwardly curved piece of sheet metal 67, for the purpose of guiding the flights of the conveyer on to the angle iron strips 39 and to prevent their catching with the outer ends thereof; this strip is merely a safe-guard and may be omitted if it is desired. The lower end of said conveyer, that is the chains or link belting composing the same, is driven on sprocket wheels 68 arranged in the boot 40 of the elevator and carried by a driving shaft 69 suitably journaled in the walls of the boot, the outer ends of which said shaft are arranged for the connecting therewith of some suitable driving means such as a tumbling shaft or other device for imparting motion to the conveyer, from a suitable source of power such as a horse power or other mechanism. The outer ends of the driving shaft 69 are journaled in boxings 70 which are suitably connected with brackets 71 adapted to have an adjustable and slidable connection with the lower ends of the tubular rods 38, such adjustment being accomplished through the bolts 72 for securing the brackets in position on the rods 38. Also carried by the rods 38 are brackets 73 provided with a nut with which are connected threaded stems or bolts 74 which engage with the brackets 71. The devices just referred to have reference to a tightener for taking up or producing slack in the conveyer chains 62, which may be accomplished by releasing the securing means for the brackets 71 and actuating the threaded stems or bolts 74 for moving the brackets 71 on the rods 38; the walls of the boot 40 through which the shaft 69 extends are suitably slotted to provide for such adjustment of the said shaft. Within the boot is provided a pivoted plate 75 which overlies the space between the end wall of the boot and the chains 62ª to prevent any material which is discharged in the boot to be described, from dropping into the lower portion of the boot, the flights as they pass through the boot, lifting said plate which is hung freely in the boot and fails as soon as the flights move beyond the same.

The conveyer which has been mentioned as being pivotally connected with the boot of the elevator comprises the trough section 80, having a substantially horizontal portion and an upwardly inclined portion. A cross section of the conveyer trough is in all respects similar to a cross section of the trough section 30 of the elevator which is best seen in Fig. 26, a cross section of the conveyer trough being seen in Fig. 10. Along the outside upper edges of the inclined portion of said conveyer trough section are attached the angle iron strips 81 for the purpose of stiffening that portion of the trough and to the upper edges of the horizontal portion of said trough section are hinged at 82 the wings 83. When the conveyer is in position to receive material discharged into the same the wings are swung outwardly substantially as is shown in full lines in Fig. 10 and serve as a guard to insure material finding its way into the body of the conveyer; such wings 83 being prevented from being swung any farther outwardly by means of the chains 84 connected with said wings and the strap 85 secured to the sides of the trough section. Secured to the sides of the trough section of the conveyer and extending down and beneath the same are straps 86, which are in all respects similar to the straps 33 and 56, referred to in connection with the trough sections 29 and 30 of the elevator and to said straps are attached brackets 87 provided with the bearings 88 at their lower ends through which pass tubular supporting rods 89 which run parallel with the horizontal and inclined portions of the trough section 80 of said conveyer. The brackets 87 at or near the outer end of the trough section of the conveyer have the depending extensions 90 to which are connected vertical portions of a rest 91, serving as a support for the outer end of said conveyer when the same has been lowered into a position to receive material to be conveyed to the elevator.

The upper ends of the rods 89, just above referred to, extend through the brackets 87 and have secured thereto arms 92 which support tubular boxings or bearings 93 in which a cross shaft 94 is journaled, said shaft also having a bearing in brackets 95 secured to the upper and forward ends of the boot 40 of the elevator; the brackets 95 are best seen in Fig. 11 and the detail connection of the arms 92 with the rods 89 are best seen in Figs. 32 and 33. The shaft 94 just referred to serves as a fulcrum on which the conveyer section may be swung and connected with said shaft is a carrier composed of the endless chains or belting 95 having secured thereto the flights 96 and said chains are driven from sprocket wheels 97 on the shaft 94 with which they connect, power being transmitted to the shaft 94 from the driving shaft 69 of the elevator by means of the chain 98 connected with a driving sprocket 99 on the shaft 69 and a driven sprocket 100 on the shaft 94; and the said chain is adapted to travel around an adjustable idler 101 suitably supported on the side of the boot of the elevator. The chains 95 travel down and beneath the trough section, around driven sprocket wheels 102 on a cross shaft 103 journaled in tubular boxings 104, detachably connected with brackets 105 carried on the outer ends of the rods 89, and said chains as they travel through the horizontal portion of the trough section 80 pass beneath guard strips 106 secured to the sides of the trough section. These guard strips not only protect the chains from material falling or being deposited into the trough of said conveyer, but also hold the chains in working position that the flights may travel along the bottom of the trough section, otherwise the said chains would extend in a straight line from the sprockets 102 to the driving sprockets 94, owing to the angle at which the inner end of the trough section is carried.

Fig. 29 shows a view of the flights 63 and the flights 96, the former being those which are connected with the chains of the elevator and the latter connected with the chains of the conveyer; their construction being different owing to the guard plates 106, arranged in the trough sections 80 above referred to.

At the outer end of the trough section 80 of the conveyer is provided a hinged plate 107 to insure none of the material discharged into the conveyer trough section passing out through the opening in the end wall thereof through which the chains and flights are adapted to enter said conveyer trough section, the pivoting of the same allowing the flights to pass thereunder when it will fall again, as the flights pass beyond the same. A guard in the form of a plate which is similar to the plate 107 and indicated as 108 is pivotally connected with the upper end of the boot 40 of the lower end of the elevator, and projects out through the upper end of said boot in engagement with the chains 95 as they leave the sprockets 97 on their return, preventing any material conveyed by the chains and flights of the conveyer to the elevator being carried around and out through the boot aforesaid. And for holding the outer end of the plate 108 in engagement with the chains and to return the same to this position after the flights have passed over said plate I provide a spring 109, these parts being best seen in Figs. 7, 80 and 11.

It is understood that when the elevator has been properly positioned in connection with a jack or other raising and lowering means, to adapt the receiving of material from a wagon to be elevated by the elevator into a suitable receptacle that the conveyer connected with the elevator, if lowered would be in the path of the wagon adapted to be driven into position to be raised by said jack or other raising and lowering means for discharging material from the wagon into the conveyer; and it is to provide for swinging the conveyer up into a position out of the way of the path of travel that the same has a pivotal connection with the elevator so as to be driven therefrom, that the rod 47 is provided connected with said conveyer and adapted to have a detachable connection with the eye 46 on the elevator, the raised position of said conveyer being shown in dotted lines in Fig. 1. This conveyer section is rather a heavy affair and to assist a person in raising the same into the position shown in Fig. 1, I have provided the spring 110 connected with the body of the elevator and with said conveyer.

In connection with the elevator and truck therefor, I have provided a yielding sustaining means for said elevator when the same has been lowered and folded into the position shown in Fig. 3, which position is the same as the parts would assume on the road or being conveyed from place to place. When the parts have been lowered and folded into the position shown in Fig. 3 if no means were provided to take the strain off of the cable 25, which assists in sustaining the parts shown in the position just referred to, as the device was moved over uneven ground there would be more or less vibration imparted to the elevator and it would have a tendency to move up and down, which might cause the teeth of the gears 48 or those of the rack 19 to be stripped from the same; but to obviate this danger, I provide a spring 111 adapted to be connected at one end to a hook 112 attached to one of the rods 3 of the truck and the opposite end of said spring is connected with a cable 113 or some similar means which is secured to a bracket 114 adapted to have a detachable connection with the drum 53 on the shaft 35. When such spring is connected in the manner just described the cable 25 may be slackened, as said spring will sustain the parts in the same position which the cable would and any vibration of the elevator will be imparted to the spring which will yield and allow the elevator to raise and lower on the rack 19 and be returned to its position by means of said spring 111.

I have shown two modes of conveying material from the discharge end of the elevator, to a bin or other suitable receptacle. One of such means is best seen in Fig. 1 and the other shown in Figs. 35, 36, and 37. In either of them a receiving hopper indicated as 115 is hung on the shaft 61 at the outer end of the upper section of the elevator, by means of the arms 116 attached to said hopper and provided with the transverse portion 117 adapted to overlie the hood 60 of the elevator when in the position shown in the drawings. In Fig. 1 a flexible spout 118 is connected with the hopper 115 and depends therefrom, said flexible spout consisting of a series of short sections of spout 119 pivotally connected with each other and with said hopper 115 by means of the chains 120. This form of discharge spout will enable an operator to place the same in almost any position for conveying material from the elevator to a suitable receptacle.

In Figs. 35, 36, and 37 a section of spout 121 is shown swiveled to the lower portion of a hopper 115, adapting the said spout to be swung in a circle. The outer end of the said spout is supported by a rod 122 connected thereto and with an extension 123 connected with the transverse portion 117 of the arms 116. For sustaining the hopper 115 and the spout 121 in an upright position or that position which is shown in Fig. 35, I have attached to one of the arms 116, see Figs. 36 and 37 a rod 124, which extends down alongside of the elevator, to the lower end thereof and is connected with a lever 126 having suitable connections with a toothed quadrant 127. This enables the operator when the elevator is being raised or lowered to regulate the position of the hopper in connection with the hood of the elevator. The rod just referred to and its operative connection at the lower end of the elevator is shown in outline only in Fig. 1, and said rod is guided in its movement by the eyes 128 supported in connection with the lower section of the elevator and said rod is hinged in its length as at 129 so as to not interfere with the folding of the sections of the elevator. My reason for showing the rod and its connections only in Fig. 1, is that I do not care to confine myself to the use of the spout shown in Fig. 1 or that shown in Figs. 35 to 37.

In Fig. 38 I have shown a cross section broken away of the lower section of the elevator wherein I have done away with the use of the rods 38 forming a part of the skeleton frame and have substituted angle iron strips 130 which are connected with the straps 33 and conveyer trough section 29 and to which may be connected the straps 42 of the lower run-way, thereby doing entirely away with the brackets 34.

It is obvious that various changes may be resorted to in the detail construction of my loading device, particularly with respect to the form and style of the skeleton frame and the manner of attaching thereto a trough and the shafts around which the chains of the conveyer travel; also with respect to the support for the elevator on a wheeled support and the character of said support and the mode of pivotally connecting a conveyer to the boot of the elevator; and I do not wish to be confined to the details as set forth.

Having thus fully described my invention, what I claim and desire to secure by Letters Patent of the United States, is:—

1. In an elevator, the combination of a support, a trough section, a series of U-shaped straps secured to said trough section, brackets connected with said straps, longitudinally disposed rods connected with said brackets, a rod extending transversely of said trough section and journaled in one of said brackets, a member rotatably mounted on said support and provided with a pivotal connection with said rod, and means for operating the said member for changing the position of the lower end of said trough section.

2. In an apparatus of the character described the combination with a support, an elevator body pivotally connected with said support to be raised and lowered, gearing connected with said body, pivotally mounted rack bars in operative connection with said gearing, a drum associated with said gearing, means for operating the drum, and yielding sustaining means for the elevator body when lowered, consisting of a spring attached at one end to the support and adapted to have connection at its opposite end with the drum.

3. In an elevator, in combination, a feeding trough section comprising a U shaped metallic body, bent into such shape from single sheets of metal, angular stiffening portions for the upper edges of the trough, U shaped straps secured to and bracing said trough, angular stiffening members for the lower angular bands of the trough and adapted to sustain the return portion of the elevator, U straps secured to said angular stiffening members, and means supported by said last mentioned U straps to serve as the return for said elevator.

In testimony whereof I affix my signature, in presence of two witnesses.

BENJAMIN M. STEELE.

Witnesses:
J. M. ANDERSON,
CHAS. W. LA PORTE.